US012783815B2

(12) United States Patent
Yang et al.

(10) Patent No.: US 12,783,815 B2
(45) Date of Patent: Nov. 3, 2026

(54) INFORMATION PROCESSING METHOD AND DEVICE

(71) Applicant: Lenovo (Beijing) Limited, Beijing (CN)

(72) Inventors: Chenguang Yang, Beijing (CN); Xuguang Gu, Beijing (CN); Meng Wang, Beijing (CN)

(73) Assignee: LENOVO (BEIJING) LIMITED, Beijing (CN)

(*) Notice: Subject to any disclaimer, the term of this patent is extended or adjusted under 35 U.S.C. 154(b) by 256 days.

(21) Appl. No.: 18/397,655

(22) Filed: Dec. 27, 2023

(65) Prior Publication Data

US 2024/0220733 A1 Jul. 4, 2024

(30) Foreign Application Priority Data

Dec. 31, 2022 (CN) ......................... 202211736833.5

(51) Int. Cl.
*G06F 40/35* (2020.01)

(52) U.S. Cl.
CPC .................................... *G06F 40/35* (2020.01)

(58) Field of Classification Search
None
See application file for complete search history.

(56) References Cited

U.S. PATENT DOCUMENTS

| | | | | |
|---|---|---|---|---|
| 9,037,462 | B2 * | 5/2015 | Williams | G06F 40/35 704/256.1 |
| 11,302,330 | B2 * | 4/2022 | Ge | G10L 15/1815 |
| 11,481,559 | B1 * | 10/2022 | Asefi | G06F 9/543 |
| 2017/0332128 | A1 * | 11/2017 | Jeong | H04M 1/72415 |
| 2019/0156827 | A1 * | 5/2019 | Jung | G10L 15/22 |
| 2020/0304441 | A1 * | 9/2020 | Bradley | G06N 5/043 |
| 2023/0087896 | A1 * | 3/2023 | Kalandyk | H04L 51/02 704/9 |
| 2023/0222291 | A1 * | 7/2023 | Ranganathan | G06N 3/08 704/9 |
| 2024/0169158 | A1 * | 5/2024 | Yannam | G06F 40/279 |
| 2024/0321267 | A1 * | 9/2024 | Voigt | H04L 51/02 |

OTHER PUBLICATIONS

Kun Qian, Satwik Kottur, Ahmad Beirami, Shahin Shayandeh, Paul Crook, Alborz Geramifard, Zhou Yu, Chinnadhurai Sankar "Database Search Results Disambiguation for Task-Oriented Dialog Systems", retrieved from arXiv:2112.08351v1 [cs.CL] Dec. 15, 2021 (Year: 2021).*

* cited by examiner

*Primary Examiner* — Richemond Dorvil
*Assistant Examiner* — Alexander G Marlow
(74) *Attorney, Agent, or Firm* — ANOVA LAW GROUP, PLLC

(57) ABSTRACT

An information processing method includes obtaining a user dialog message in a dialog interaction interface; determining a user's first intention of the user dialog message; in response to a determination that the user's first intention and a user's second intention do not satisfy a correlation condition, outputting an intention decision prompt, the intention decision prompt being used to prompt the user to confirm on which intention to process; and according to a response result from the user to the intention decision prompt, outputting a dialog feedback message based on the user's first intention or the user's second intention.

18 Claims, 5 Drawing Sheets

INFORMATION PROCESSING METHOD AND DEVICE

RELATED APPLICATION(S)

This application claims priority to Chinese Patent Application No. 202211736833.5 filed with the National Intellectual Property Administration, PRC on Dec. 31, 2022, the content of which is incorporated herein by reference in entirety.

FIELD OF THE TECHNOLOGY

The present disclosure relates to a field of information processing technology, and in particular to an information processing method and device.

BACKGROUND

Smart dialog refers to the use of smart dialog equipment (such as smart dialog terminals or smart dialog application servers) to simulate customer service or other personnel to interact with real users in the form of text or voice information. For example, the intelligent customer service server may return answer information related to the question to the user terminal based on the question sent by the user terminal.

In the smart dialog scenario, after the user inputs a dialog message to the smart dialog device, when the interaction task for the dialog message has not been completed, the user enters another dialog message that is not related to the prior dialog message, then the smart dialog device may jump to the processing flow of an interaction task corresponding to the newly input dialog message, which may cause the interaction task for the prior dialog message that the user expects to process not to be effectively solved, resulting unreasonable handling of message-related interaction tasks related to the dialog messages.

SUMMARY

In one aspect, the present disclosure provides an information processing method. The method includes: obtaining a user dialog message in a dialog interaction interface; determining a user's first intention of the user dialog message; in response to a determination that the user's first intention and a user's second intention do not meet a correlation condition, outputting an intention decision prompt, the intention decision prompt being used to prompt the user to confirm on which intention to process; and according to a response result from the user to the intention decision prompt, outputting a dialog feedback message based on the user's first intention or the user's second intention.

In certain embodiment(s), outputting the dialog feedback message includes obtaining a decision result input by the user in response to the intention decision prompt; when the decision result indicates that the user wishes to continue processing the user's second intention, and based on a dialog context associated with the user's second intention, outputting a dialog feedback message related to the user's second intention to the dialog interaction interface.

In certain embodiment(s), outputting the dialog feedback message includes when the decision result indicates that the user does not wish to continue processing the user's second intention, outputting a dialog feedback message to the dialog interaction interface based on the user's first intention and the user dialog message.

In certain embodiment(s), outputting the dialog feedback message includes when no response operation is detected for the intention decision prompt after a set time period, outputting a dialog feedback message to the dialog interaction interface based on the user's first intention and the user dialog message.

In certain embodiment(s), outputting the dialog feedback message includes: based on the user's first intention, outputting the dialog feedback message corresponding to the user dialog message to the dialog interaction interface; the method further includes: after confirming that the dialog interaction task related to the user's first intention has been processed, outputting the intention processing prompt, the intention processing prompt being used to prompt the user on whether to process the user's second intention; detecting a confirmation processing indication input to the intention processing prompt, and outputting a dialog feedback message related to the user's second intention to the dialog interaction interface based on the dialog context associated with the user's second intention, the confirmation processing indication indicating that the user wishes to continue processing the user's second intent.

In certain embodiment(s), the method further includes after confirming that the dialog interaction task related to the user's second intention has been processed, outputting a dialog feedback message to the dialog interaction interface based on the user's first intention and the user dialog message.

In certain embodiment(s), the user's second intention is a user intention for which the dialog interaction task has not been completed, and the method further includes: when the decision result indicates that the user does not wish to continue processing the user's second intention, marking the user's second intention as a user intention for which the dialog interaction task has been completed.

In certain embodiment(s), the user's second intention is a user intention for which the dialog interaction task has not been completed; that the user's first intention and the user's second intention do not meet the correlation conditions includes that the user's first intention and the user's second intention with the latest cache time do not meet the correlation condition; the method further includes: in response to a determination that the user's first intention and the user's second intention do not meet the correlation condition, caching the user's first intention as a user intention for which the dialog interaction task has not been completed and recording the cache time of the user's first intention.

In another aspect, the present disclosure provides an information processing device. The device includes: a memory storing computer program instructions; and a processor coupled to the memory and configured to execute the computer program instructions and perform: obtaining a user dialog message in a dialog interaction interface; determining a user's first intention of the user dialog message; in response to a determination that the user's first intention and a user's second intention do not meet a correlation condition, outputting an intention decision prompt, the intention decision prompt being used to prompt the user to confirm on which intention to process; and according to a response result from the user to the intention decision prompt, outputting a dialog feedback message based on the user's first intention or the user's second intention.

In yet another aspect, the present disclosure provides a non-transitory computer-readable storage medium storing computer program instructions executable by at least one processor to perform: obtaining a user dialog message in a dialog interaction interface; determining a user's first intention of the user dialog message; in response to a determination that the user's first intention and a user's second intention do not meet a correlation condition, outputting an intention decision prompt, the intention decision prompt being used to prompt the user to confirm on which intention to process; and according to a response result from the user to the intention decision prompt, outputting a dialog feedback message based on the user's first intention or the user's second intention.

In certain embodiment(s), after determining the user's first intention of the user dialog message in the dialog interaction interface, in response to a determination that the user's first intention and the user's second intention do not meet the correlation condition, an intention decision prompt is output, to prompt the user to determine the intention of processing as desired. Since the user's response to the intention decision prompt reflects the user intention that the user wants to process, based on the user's response to the intention decision prompt, the user intention on what to be processed is more reasonably determined and the dialog feedback message is given, reducing situations in which user intention that the user wishes to be handled is not handled effectively.

BRIEF DESCRIPTION OF THE DRAWINGS

To more clearly illustrate the technical solutions of certain embodiment(s) of the present disclosure, the drawings used in the description are briefly introduced below. The drawings in the following description are directed to certain embodiments of the present disclosure. Variations to the drawings may be obtained without having to exert creative efforts.

DETAILED DESCRIPTION

The technical solutions in certain embodiments of the present disclosure are described below with reference to the accompanying drawings. The described embodiments are only some of the embodiments of the present disclosure, rather than all of the embodiments. Based on the embodiments in the present disclosure, variations and modification obtained fall within the scope of protection of the present disclosure.

Figure 1:
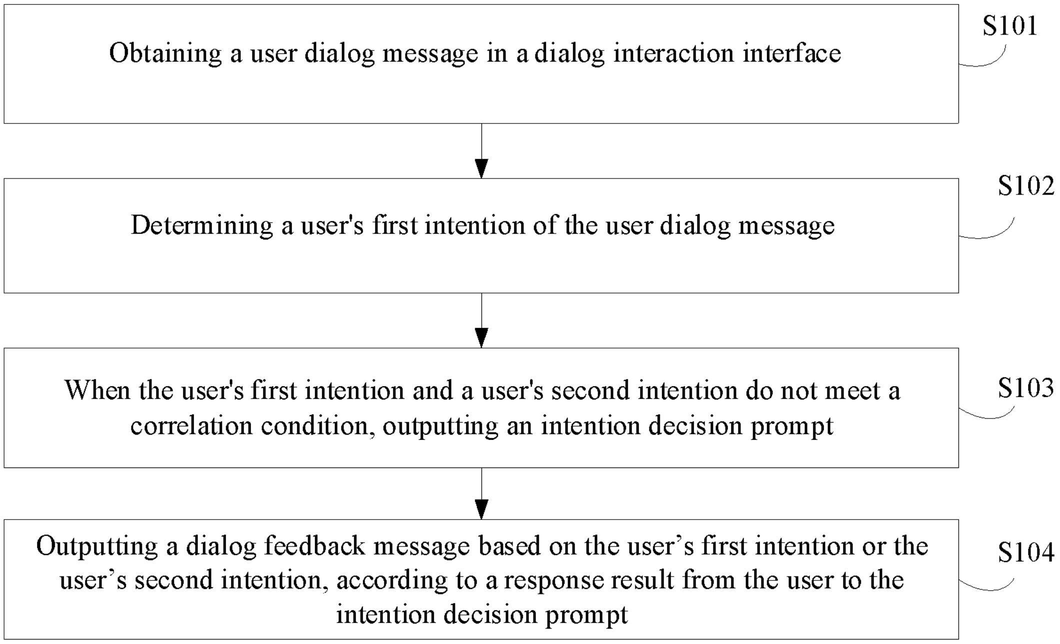
FIG. 1 is a schematic flowchart of an information processing method according to certain embodiment(s) of the present disclosure.

As shown in FIG. 1, which illustratively shows a schematic flow chart of an information processing method according to certain embodiment(s) of the present disclosure. The information processing method may be applied to an intelligent dialog server or an intelligent dialog terminal, which is not limited herein.

The information processing method in certain embodiment(s) may include:

S101. Obtaining a user dialog message in a dialog interaction interface.

where, the user dialog message refers to a dialog message input by the user.

For example, the user dialog message may be a dialog message in the form of text input by the user to the dialog interaction interface; or it may be a user dialog message input by the user in the form of voice. In certain embodiment (s), the user dialog message includes or is a picture or other form of dialog message, which is not limited here.

When the information processing method according to certain embodiment(s) of the present disclosure is applied to a smart dialog server, the smart dialog server obtains the dialog message in the smart interaction interface through the smart dialog client where the smart dialog application is located.

When the information processing method according to certain embodiment(s) of the present disclosure is applied to a smart dialog terminal, the smart dialog terminal directly detects and obtains the user dialog message input by the user to the dialog interaction interface.

S102. Determining a user's first intention of the user dialog message.

A user intention of the user dialog message refers to an intention of the user dialog message, that is, a main meaning expressed by the user dialog message, such as the dialog purpose or dialog requirement expressed by the user dialog message.

There are many possible implementation methods for determining the user intention of the user dialog message. For example, natural language recognition technology may be used to perform intention recognition on the user dialog message to obtain the user intention of the user dialog message. Other identification methods for identifying user intentions of user dialog messages are also applicable. There is no limitation to the user intention identification method.

In certain embodiment(s), and for convenience, the intention of the user dialog message is called the user's first intention.

S103: If a user's first intention and a user's second intention do not meet a correlation condition, an intention decision prompt is output.

The user's second intention is a user intention for which a dialog interaction task has not yet been completed, that is, a user intention for which it has not yet been confirmed that the processing has been completed (or that the processing has ended). The dialog interaction task for the user's intention is the dialog interaction required to complete the processing of the user's intention.

For example, in human-computer interaction scenarios, each dialog message input by the user will correspond to a user intention, but the user intentions of different dialog messages can be related and belong to the same type of user intention. On this basis, processing of multiple dialog messages associated with the same type of user intention (that is, relevant user intentions) belongs to the dialog interaction tasks corresponding to this type of user intentions. For example, when the user only conducts dialog consultation on a certain issue, although the user intentions of each dialog message entered by the user may not be exactly the same, the user intentions of different dialog messages are all related to the user intention of consulting the issue. When it is confirmed that the problem has been solved, it means that the dialog interaction task corresponding to the user intention of consulting the problem has been completed; otherwise, the dialog interaction task of consulting the user intention related to the problem has not been completed.

In certain embodiment(s), the user's second intention also belongs to the user intention corresponding to the user, but the user's second intention is determined before the user's first intention. The user dialog message on which the user's second intention is determined is also obtained before step S101.

The correlation condition refers to the condition of correlation between user's different intentions. This correlation condition can also vary based on different ways of evaluating the relevance of user intent.

For example, the non-satisfaction of correlation conditions between the user's first intention and the user's user's second intention may include any of the following:

The intention similarity between the user's first intention and the user's second intention is lower than a set threshold;

The user's first intention and the user's second intention do not belong to the same user intention type.

User intention types may be divided in multiple ways, and there are no restrictions on this.

Discussed above are just examples of several situations. In other implementations, there are other possibilities for analyzing whether there is correlation between user intentions, and the present disclosure does not limit this.

When the correlation condition between the user's first intention and the user's second intention is not satisfied, it means that during the user's dialog interaction with the smart customer service server or smart terminal based on the dialog interaction interface, there is an intention deviation in the before and after dialog messages input by the user, that is, the user's dialog message is not related to the recently entered historical dialog message of the user. When the user dialog message is processed, it may result that the questions waiting to be consulted or the interactive information have not been processed, which in turn not only makes the dialog interaction appear jumpy, but also makes that the user's second intention wanted by the user not timely processed.

In certain embodiment(s), the present disclosure outputs an intention decision prompt when or in response to a determination that the correlation condition is not met between the identified user's first intention and the user's second intention that has not yet been processed. This intention decision prompt is used to prompt the user to confirm the intention that needs to be processed so that the user decides which user intention to process.

The prompt method of the intention decision prompt may have multiple possibilities, and there is no restriction on this.

For ease of understanding, several possible scenarios for intention decision prompt are described below:

In certain embodiment(s), the intention decision prompt prompts the user whether to continue processing the dialog interaction task corresponding to the user's second intention. When the user confirms to continue processing the user's second intention, the user confirms that the user wants the user's second intention be processed. When the user confirms not to continue processing the user's second intention, it is determined that what the user wants the user's first intention be processed.

For example, assuming that the user's first intention is "setting a ringtone" and the user's second intention is "mobile phone crashes," the prompt content of the intention decision prompt may include prompt information: "Has the problem of "mobile phone crashes" been solved?" and options: "Yes" and "No." When the user selects "No," it is confirmed that the user wants to continue processing the dialog interaction task related to the user intention of "mobile phone crashes." On the contrary, when the user selects "Yes," it means that the user needs to process the dialog interaction task related to the user's first intention of "setting a ringtone."

In certain embodiment(s), the intention decision prompt prompts the user whether to end processing of the dialog interaction task corresponding to the user's second intention.

In certain embodiment(s), the intention decision prompt prompts the user to select the user's first intention or the user's second intention. For example, the prompt content of the intention decision prompt reflects "Please select the items to be processed: item 1; item 2," and each item represents a user intention.

There are other possibilities for the specific prompt method of the intention decision prompt, and there is no restriction on this.

S104: According to the user's response to the intention decision prompt, outputting a dialog feedback message based on the user's first intention or the user's second intention.

A response result for the intention decision prompt reflects the user's intention to be processed. In certain embodiment(s), the user intention of processing is determined from the user's first intention and the user's second intention in combination with the response result, and the dialog interaction processing is performed based on the determined user intention.

In certain embodiment(s), the dialog feedback message output based on the user intention (the user's first intention or the user's second intention) is a dialog reply message based on the dialog message associated with the user intention based on the smart dialog server or the smart dialog. In certain embodiment(s), the dialog feedback message is a guide sentence for prompting the user to enter specific problem description information, output based on the user intention. In certain embodiment(s), the dialog feedback message is a further inquiry sentence given for the user intention. Of course, there can be other possibilities for this, there is no restriction on this.

In certain embodiment(s) of the present disclosure, after determining the user's first intention of the user dialog message in the dialog interaction interface, when or in response to a determination that the user's first intention and the user's second intention do not meet the correlation condition, an intention decision prompt is output, to prompt the user to determine the intention of a desired processing. Since the user's response to the intention decision prompt reflects the user intention that the user wants to process, based on the user's response to the intention decision prompt, the user intention waiting to be processed is more properly determined and the dialog feedback message is given, thereby reducing situations in which user intention that the user wishes to be handled is not handled effectively.

The information processing method of the present disclosure is introduced below based on the different situations of the response results for the intention decision prompt.

Figure 2:
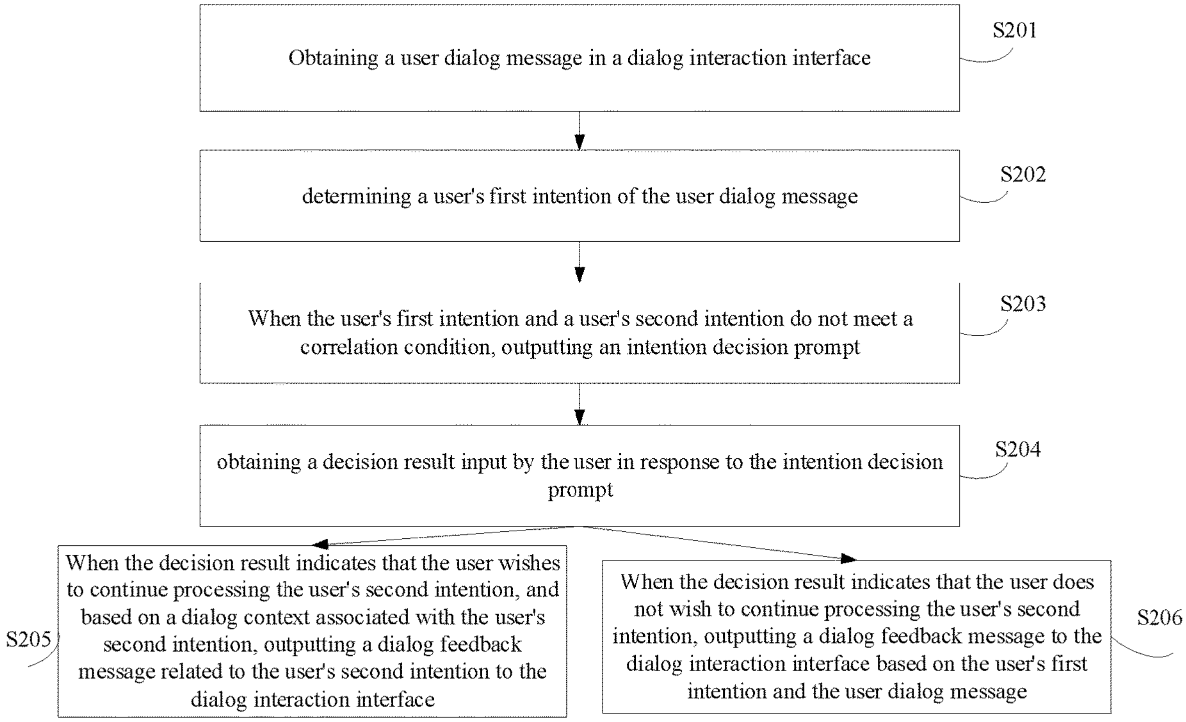
FIG. 2 is another schematic flow diagram of an information processing method according to certain embodiment(s) of the present disclosure.

As illustratively shown in FIG. 2, it shows a schematic flowchart of an information processing method according to certain embodiment(s) of the present disclosure, which includes:

S201: Obtaining a user dialog message in a dialog interaction interface.

S202. Determining a user's first intention of the user dialog message.

S203: When or in response to a determination that the user's first intention and a user's second intention do not meet a correlation condition, outputting an intention decision prompt, where the intention decision prompt is used to prompt the user to confirm the intention of a desired processing.

A description of these steps may be found elsewhere in the present disclosure, and is not duplicated here.

S204: Obtaining a decision result input by the user in response to the intention decision prompt.

When the decision result is obtained, it indicates that the user has responded to the intention decision prompt and confirmed or selected the required processing intention for the intention decision prompt. Accordingly, the decision result represents the user's intention to be processed, and the user's intention to be processed belongs to one of the user's first intention and the user's second intention.

For example, when the intention decision prompt prompts the user to decide whether to continue processing the dialog interaction task corresponding to the user's second intention, when the user selects "Yes," the decision result is that the user wants to process the user's second intention; when the user selects "No," then the decision result is that the user does not want to continue processing the user's second intention, which also indicates that the user thinks that the user's first intention is to be processed.

For scenarios where the intention decision prompt is a user's first intention or a user's second intention that prompts the user to select the required processing, or where the intention decision prompt is another prompt method, the decision results are also similar and are not repeated for brevity.

S205: When the decision result indicates that the user wishes to continue processing the user's second intention, based on the dialog context associated with the user's second intention, outputting to the dialog interactive interface a dialog feedback message related to the user's second intention, where the dialog context associated with the user's second intention refers to the user dialog message in which the user's first intention and the user's second intention satisfy the correlation condition.

In certain embodiment(s), the dialog context associated with the user's second intention belongs to the user dialog message obtained through the dialog interaction interface and related to the user's second intention. In certain embodiment(s), a time when the user's second intention is determined is earlier than a time when the user's first intention is determined, the user dialog message related to the user's second intention is the user dialog message obtained before step S201.

The dialog feedback message related to the user's second intention may be a reply message or a prompt message given in conjunction with the dialog context associated with the user's second intention, without limitation.

For example, in certain embodiment(s), when the user's first intention is being determined, there is a target user dialog message in the dialog context associated with the user's second intention which is waiting for a reply message, then the user's second intention can be combined, a dialog reply message for the target user's dialog message is output to the dialog interaction interface.

The target user dialog message may be the user dialog message associated with the user's second intention and is obtained at the latest time.

For example, assume that after the user inputs dialog message 1 to the dialog interaction interface, the user intention of the dialog message 1 is identified as user intention A. However, before the smart dialog terminal or the smart dialog server outputs a reply message for the dialog message, it is obtained on the dialog interaction interface that the user input dialog message 2, the user intention of the dialog message 2 is identified as user intention B, and user intention A is different than user intention A. In certain embodiment(s) of the present disclosure, it is determined that when the user wants to continue processing user intention A, since no reply message has been output to the dialog interaction interface for the dialog message 1, the dialog message 1 is regarded as the target user dialog message, and the smart dialog terminal or the intelligent dialog server outputs a reply message to the dialog message 1 to the dialog interaction interface based on the user intention A.

In certain embodiment(s), the smart dialog terminal or the smart dialog server outputs reply messages based on the sequence of dialog messages in the dialog interaction interface. In certain embodiment(s), when the user's first intention is determined, there may be no target user dialog message waiting for a reply message in the dialog context associated with the user's second intent.

In certain embodiment(s), the dialog context associated with the user's second intention may include at least one user dialog message that is relevant to the user intention, such as a given number of user dialog messages associated with the user's second intention and obtained most recently. In certain embodiment(s), based on the dialog context associated with the user's second intention, the output dialog feedback message is a prompt message for prompting the user to input information. For example, the dialog feedback message may prompt the user to input some detailed description information or remaining questions, or the like, to solve the problem corresponding to the user's second intention. There is no limit on the dialog feedback message.

In certain embodiment(s), and after outputting the dialog feedback message related to the user's second intention to the dialog interactive interface, the user continues the dialog message interaction related to the user's second intention with the smart dialog terminal or the smart dialog server through the dialog interactive interface, to finally solve or complete the dialog interaction task corresponding to the user's second intention. In certain embodiment(s) of the present disclosure, the information processing method returns to processing the dialog message related to the user's first intention after confirming that the dialog interaction task related to the user's second intention has been processed, that is, based on the user's first intention and the dialog message, to output dialog feedback messages in the dialog interaction interface.

There may be many ways to confirm that the dialog interaction task related to the user's second intention has been processed. For example, it may be that there is no new input of the user dialog message related to the user's second intention for a long time, or the user inputs a confirmation operation or confirmation instruction to confirm completion of processing the user's second intention. There is no restriction on this.

S206: When the decision result indicates that the user does not want to continue processing the user's second intention, based on the user's first intention and the user dialog message, outputting a dialog feedback message to the dialog interactive interface.

In certain embodiment(s), when the user does not wish to continue processing the user's second intention, it means that the user wishes to process the dialog interaction task related to the user's first intention.

In certain embodiment(s), after determining that the user's first intention and the user's second intention do not meet the correlation condition, the smart dialog terminal and/or the smart dialog server outputs a reply message to the user dialog message obtained in step S201. In certain embodiment(s), the dialog feedback message output in combination with the user's first intention and the dialog message may be a prompt message for processing the user's first intention, a prompt statement, or a dialog message containing resolution strategies given to solve or complete the processing of the user's first intention. There is no restriction on this.

For example, when the user inputs a user dialog message "My mobile phone operation always gets stuck", then the user's first intention is determined as "Mobile phone stuck," when the user's first intention is different from the user's second intention corresponding to a second dialog message that is input prior to the first dialog message corresponding to the user's first intention, and before receiving the decision result entered by the user for the intention decision prompt, the smart dialog terminal or server has already output to the user's dialog message "My mobile phone operations always gets stuck" a reply message "Please restart your phone and try," and when it is determined that the decision result is to process the user's first's intention, the dialog feedback message that is output is a dialog interaction message, for example, "Has your problem been solved after restarting?" Or, the output dialog feedback message is a dialog prompt message that is different from the dialog interaction message: "We are dealing with the problem of mobile phone jamming to continue on your issue." The font size, color or other message of the dialog prompt message is different from the dialog interaction message. For example, the font of the dialog prompt message is smaller.

When the user's second intention has not yet been confirmed to be processed, jumping to process the user dialog message related to the user's first's intention and giving a dialog reply message to the user dialog message may result in missing on the user's second intention. In addition, the dialog message processing method tends to be too rigid and the dialog message processing tends to jump too much, which may bring a less than satisfactory experience to the user. In certain embodiment(s), the method according to certain embodiment(s) of the present disclosure processes the user dialog message related to the user's first intention after obtaining the decision result and the decision result indicates that it does not want to continue processing the user's second intention.

In certain embodiment(s), when it is determined that the decision result indicates that the user does not wish to continue processing the user's second intention, and a reply has not yet been given to the user dialog message obtained in step S201, and in view of the user's first intention, the method outputs to the dialog interaction interface a reply feedback message corresponding to the user dialog message. The dialog feedback message may be a reply message output by the smart dialog terminal or the smart dialog server.

There are many possibilities for the implementation of giving the dialog feedback message, using the user's first intention and the user dialog message. For example, the user's first intention and the user dialog message may be combined, keywords may be searched from the corpus, and the sentence combination template may be combined, or the like, to construct dialog feedback messages. Of course, there are many possibilities in the specific implementation, and there is no restriction to this.

In certain embodiment(s), the user's second intention is a user intention for which the dialog interaction task has not completed. However, when the user thinks that there is no desire to process the user's second intention, it means that the user thinks that the problem expressed by the user's second intention has been solved, or the processing required by the user's second intention has been completed. The user's second intention may be processed later. In certain embodiment(s), when the decision result indicates that the user does not want to continue processing the user's second intention, the user's second intention is marked as a user intention for which the dialog interaction task has been completed.

In certain embodiment(s), when the user does not want to continue processing the user's second intention, or the user does not care whether the processing of the user's second intention has been completed, or the user does not see the intention decision prompt in time, it is possible that no response is given to the intention decision prompt.

In certain embodiment(s), to avoid causing user dissatisfaction due to not processing the user dialog message input by the user for a long time, or causing a long delay in the processing of the user dialog message, the present disclosure, based on a response result to the intention decision prompt can also include:

When or in response to a determination that no response operation is detected for the intention decision prompt after a set time period, a dialog feedback message is output to the dialog interaction interface based on the user's first intention and the user dialog message obtained in S101 or S201.

In certain embodiment(s), based on the user's first intention and the user dialog message, description in relation to the dialog feedback message output by the dialog interaction interface may be found in the relevant introduction of FIG. 2, which is not repeated here for brevity.

There are situations where the user may not have entered the decision result because he did not see the intention decision prompt in time. To avoid erroneously determining the user's second intention as that the dialog interaction task has been completed while the user rather wants to process the user's second intention, the method outputs an intention processing prompt after confirming that the dialog interaction task related to the user's first intention has been processed. The intention processing prompt is used to prompt the user whether to process the user's second intention.

Upon detecting a confirmation processing instruction inputted for the intention processing prompt, a dialog feedback message related to the user's second intention may be output to the dialog interaction interface based on the dialog context associated with the user's second intention, where, the confirmation processing indication indicates that the user wishes to continue processing the user's second intention.

In certain embodiment(s), description on outputting the dialog feedback message in view of the dialog context associated with the user's second's intention may be found in description relating to FIG. 2, and is not repeated here for brevity.

In any of the above embodiments of the present disclosure, if the user frequently inputs user dialog messages with multiple different user intentions, there may be cached multiple user intentions for which the dialog interaction task has not been completed. However, when the user inputs multiple user dialog messages with different user intentions, the user generally only cares about whether the user intention corresponding to the most recently input user dialog message is resolved. After determining the user's first intention of the user dialog message, the method according to certain embodiment(s) of the present disclosure determines whether the user's first intention and the user's second intention with the latest cache time do not satisfy the correlation condition.

After the user's first intention or the user's second intention is processed, to compare the subsequently input user dialog message with the user's first intention, the method according to certain embodiment(s) of the present disclosure includes caching the user's first intention. In certain embodiment(s), when or in response to a determination that the user's first intention and the user's second intention do not meet the correlation condition, the user's first intention is cached as a user intention for which the dialog interaction task has not been completed and the cache time of the user's first intention is recorded.

In certain embodiment(s), when it is determined that the user's first intention and the user's second intention do not satisfy the correlation, the user's first intention is stored as the user intention for which the dialog interaction task has not been completed.

In certain embodiment(s), when or in response to a determination that the user's first intention and the user's second intention do not meet the correlation condition, the user dialog message related to the user's second intention is processed. There are many other possibilities for the timing or triggering conditions with which the user's first intention is cached. In certain embodiment(s), different processing methods may be used according to the different response results of the intention decision prompt.

To facilitate understanding, the description is provided below in view of a possible situation.

Figure 3:
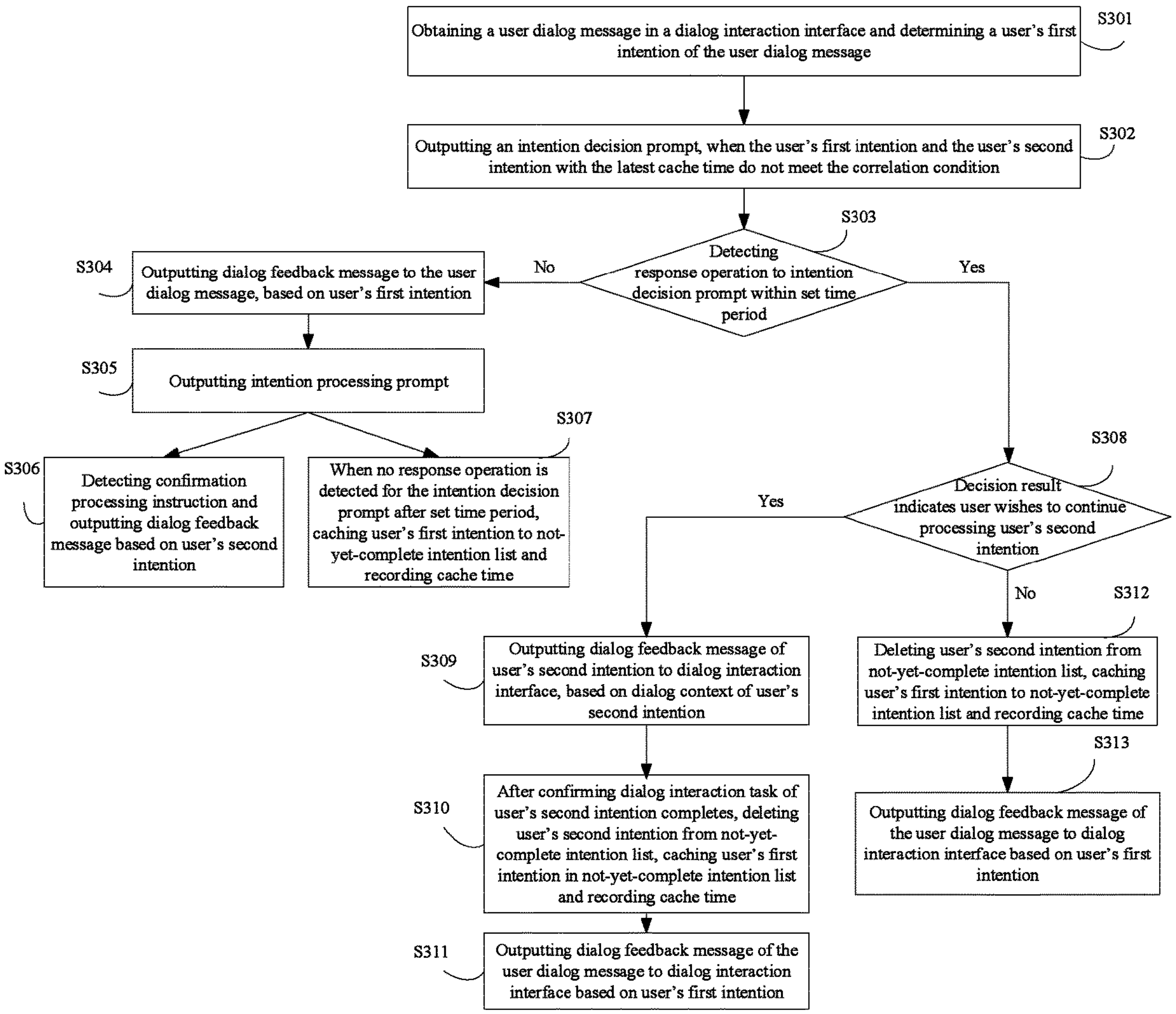
FIG. 3 is another schematic flow diagram of an information processing method according to certain embodiment(s) of the present disclosure.

As illustratively shown in FIG. 3, it shows another schematic flow chart of the information processing method provided according to certain embodiment(s) of the present disclosure, and the method includes:

S301: Obtaining a user dialog message in a dialog interaction interface and determining a user's first intention of the user dialog message.

S302: When or in response to a determination that the user's first intention and a user's second intention with the latest cache time in the not-yet-complete intention list do not meet the correlation condition, an intention decision prompt is output, where, the not-yet-complete intention list stores user intentions for which the dialog interaction task has not been completed.

In certain embodiment(s), to avoid processing user intentions that the user no longer cares about, the cache time of the user intentions cached in the not-yet-complete intention list is less than a set threshold from the current moment. In certain embodiment(s), when there is a user intention in the not-yet complete intention list whose cache time from the current moment reaches or exceeds the set threshold, the user intention is deleted.

In certain embodiment(s), the not-yet-complete intention list to store user intentions for which dialog interaction tasks have not been completed is used as an example. However, caching user intentions for which dialog interaction tasks have not been completed in other ways is also applicable. There is no restriction to this.

S303: Checking whether there is a response operation for the intention decision prompt within a set time period. If not, executing step S304; if yes, executing step S308.

S304: Based on the user's first intention, outputting a dialog feedback message corresponding to the user dialog message to the dialog interaction interface.

In certain embodiment(s), the step S301 of obtaining the user dialog message is processed only when the user does not want to process the user's second intention.

S305, outputting the intention processing prompt.

In certain embodiment(s), after confirming that the user's first intention has been processed, to further reduce the situation where the user wants to process the user's second intention but does not process the user's second intention, the method outputs the intention processing prompt. The intention processing prompt is used to prompt the user on whether to process the user's second intention.

S306: Detecting a confirmation processing instruction in response to the intention processing prompt, and outputting a dialog feedback message related to the user's second intention to the dialog interaction interface based on the dialog context associated with the user's second intention, where, the confirmation processing indication indicates that the user wishes to continue processing the user's second intention.

S307: If no response operation is detected for the intention processing prompt or a non-processing instruction for the intention processing prompt is detected, caching the user's first intention into the not-yet-complete intention list, and recording the cache time at which the user's first intention is cached into the not-yet-complete intention list, where, the no-processing instruction is used to indicate not to process the user's second intention.

In certain embodiment(s), when it is determined that the user does not process the user's second intention, the user's first intention is cached into the non-yet-complete intention list, and when other user dialog messages are subsequently received, user intentions corresponding to the subsequently received user dialog messages are compared with the user's first intention for relevance.

In certain embodiment(s), the method includes caching the user's first intention to the not-yet-complete intention list only after confirming that the user's second intention is not be processed, to avoid a situation where user dialog messages related to the user's second intention are erroneously compared to the user's first intent, while the user intends that the user's second intention be processed.

In certain embodiment(s), before caching the user's first intention into the not-yet-complete intention list, the user's first intention can be cached in other places, such as to be cached as a user intention in a processing state. There is no restriction on this.

S308: Obtaining a decision result corresponding to the response operation and determining whether the decision result indicates that the user wants to continue processing the user's second intention. If yes, executing step S309; if not, executing step S312.

S309: Based on the dialog context associated with the user's second intention, outputting a dialog feedback message related to the user's second intention to the dialog interaction interface.

S310, after confirming that the dialog interaction task related to the user's second intention has been processed, marking the user's second intention as a user intention for which the dialog interaction task has been completed, deleting the user's second intention from the not-yet-complete intention list, and caching the user's first intention into the not-yet-complete intention list, and recording the cache time at which the user's first intention is cached into the not-yet-complete intention list.

In certain embodiment(s), and in view of step S307, after confirming that the user's second intention is completed, the user's first intention is cached into the not-yet-complete intention list, to prevent the user from interacting with the smart dialog terminal or smart dialog server regarding the user's second intention, and to avoid a situation where the user dialog message related to the user's second intention is erroneously compared with the user's first intention.

S311: Based on the user's first intention, outputting to the dialog interaction interface a dialog feedback message corresponding to the user dialog message.

In certain embodiment(s), and after step S312, when another user dialog message is received, since the last cached time of the current not-yet-complete dialog list is of the user's first intention, the smart dialog terminal or the smart dialog server compares whether the user intention of the another user dialog message and the user's first intention satisfy the correlation condition.

The order of steps S310 and S311 may be interchanged or the steps S310 and S311 may be executed synchronously. There is no restriction on this.

S312. Marking the user's second intention as a user intention for which the dialog interaction task has been completed, deleting the user's second intention from the not-yet-complete intention list, caching the user's first intention into the not-yet-complete intention list, and recording the cache time at which the user's first intention is cached into the not-yet-complete intention list.

The order of steps S312 and S313 may be interchanged or the steps S312 and S313 may be executed synchronously. There is no restriction on this.

S313. Based on the user's first intention, outputting a dialog feedback message corresponding to the user dialog message to the dialog interaction interface.

The order of steps S312 and S313 may be interchanged or the steps S312 and S313 may be executed synchronously. There is no restriction on this.

In certain embodiment(s), the user's first intention and the user's second intention do not satisfy the correlation condition. In certain embodiment(s), the user's first intention and the user's second intention corresponding to the user dialog message satisfy the correlation condition, the user dialog message is processed without performing other operations. Certain details are not repeated here for brevity.

Corresponding to an information processing method of the present disclosure, the present disclosure also provides an information processing device.

Figure 4:
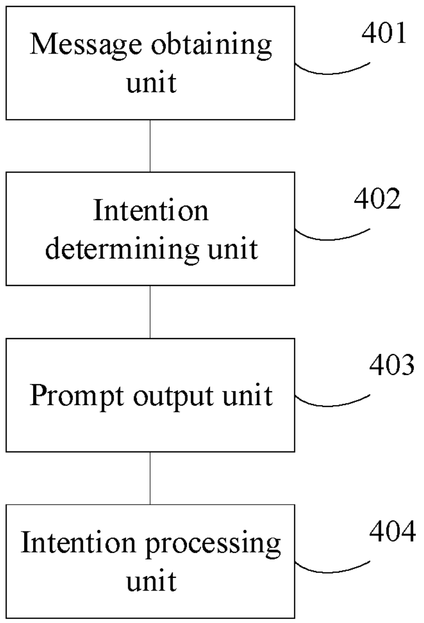
FIG. 4 is a schematic structural diagram of an information processing device according to certain embodiment(s) of the present disclosure.

As illustratively shown in FIG. 4, it shows a schematic structural diagram of an information processing device according to certain embodiment(s) of the present disclosure, where the device includes:

A message obtaining unit 401, configured to obtain user dialog messages in the dialog interaction interface;

An intention determining unit 402, configured to determine the user's first intention of the user dialog message;

A prompt output unit 403, configured to output an intention decision prompt when or in response to a determination that the user's first intention and the user's second intention do not meet the correlation condition, and the intention decision prompt is used to prompt the user to confirm on whether to process the intention;

An intention processing unit 404, configured to output a dialog feedback message based on the user's first intention or the user's second intention according to the user's response result to the intention decision prompt.

In certain embodiment(s), the intention processing unit includes one or more of:

A decision acquisition unit, configured to obtain the decision result input by the user in response to the intention decision prompt;

A first intention processing unit, configured to, when the decision result indicates that the user wishes to continue processing the user's second intention, output the dialog feedback messages related to the user's second intention to the dialog interactive interface based on the dialog context associated with the user's second intention.

In certain embodiment(s), the intention processing unit further includes:

A second intention processing unit, configured to output a dialog feedback message to the dialog interactive interface based on the user's first intention and the user dialog message when the decision result indicates that the user does not wish to continue processing the user's second intention.

In certain embodiment(s), the device further includes:

A third intention processing unit, configured to, after the first intention processing unit outputs the dialog feedback message related to the user's second intention to the dialog interaction interface, confirm that the dialog interaction task related to the user's second intention has been completed, and output the dialog feedback message to the dialog interaction interface based on the user's first intention and the user dialog message.

In certain embodiment(s), the user's second intention is a user intention for which the dialog interaction task has not been completed, and the device also includes:

An intention marking unit, configured to mark the user's second intention as a user intention for which the dialog interaction task has been completed, when the decision result indicates that the user does not wish to continue processing the user's second intention.

In certain embodiment(s), the intention processing unit includes:

A new intention processing unit, configured to output a dialog feedback message to the dialog interactive interface based on the user's first intention and the user dialog message, when no response operation to the intention decision prompt is detected for a set time period.

In certain embodiment(s), the new intention processing unit includes:

A new intention processing subunit, configured to output a dialog feedback message corresponding to the user dialog message to the dialog interaction interface based on the user's first intent, when no response operation is detected for the intention decision prompt after a set time period.

In certain embodiment(s), the device also includes:

A prompt output unit, configured to output an intention processing prompt after confirming that the dialog interaction task related to the user's first intention has been processed, and the intention processing prompt is used to prompt the user on whether to process the user's second intention;

A dialog processing unit, configured to detect a confirmation processing indication for the intention processing prompt input, and output dialog feedback message related to the user's second intention to the dialog interaction interface based on the dialog context associated with the user's second intention, the confirmation processing indication indicates that the user wishes to continue processing the user's second intention.

In certain embodiment(s), the user's second intention is a user intention for which the dialog interaction task has not yet been completed.

When the prompt output unit determines that the user's first intention and the user's second intention do not meet the correlation condition, in particular it determines that the user's first intention and the user's second intention with the latest cache time do not meet the correlation condition, the device further includes:

An intention caching unit, configured to, when or in response to a determination that the user's first intention and the user's second intention do not meet the correlation condition, cache the user's first intention as a user intention for which the dialog interaction task has not yet been completed, and record the cache time of the user's first intention.

Figure 5:
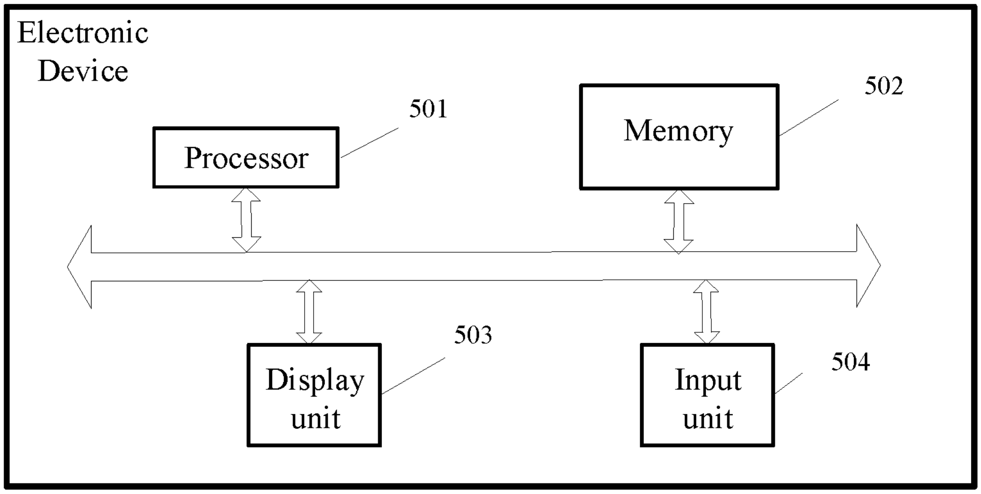
FIG. 5 is a schematic structural diagram of an electronic device according to certain embodiment(s) of the present disclosure.

In certain embodiment(s), the present disclosure also provides an electronic device, illustratively shown in FIG. 5, which shows a schematic structural diagram of the electronic device. The electronic device can be any type of electronic device, and the electronic device at least includes processor 501 and memory 502;

where, the processor 501 is configured to execute the information processing method in any of the embodiment(s) described herein, and the memory 502 is configured used to store programs desired by the processor to perform operations.

In certain embodiment(s), the electronic device may also include a display unit 503 and an input unit 504.

In certain embodiment(s), the electronic device may also have more or less components than those shown in FIG. 5. There is no restriction to this.

In certain embodiment(s), the present disclosure also provides a computer-readable storage medium, which stores at least an instruction, at least a program, a code set or an instruction set, and the instruction, the program, code set or instruction set is loaded and executed by the processor to implement the information processing method described in any of the embodiment(s) described herein.

The present disclosure in certain embodiment(s) also provides a computer program, which includes computer instructions stored in a computer-readable storage medium. When the computer program is run on the electronic device, the computer program is used to execute the information processing method in any of the embodiment(s) described herein.

In certain embodiment(s) of the present disclosure, the terms "first", "second", "third", "fourth", or the like, (when present) in the description, claims and the above-mentioned drawings are used to distinguish similar parts and not necessarily used to describe an order or sequence. Data so used are interchangeable under appropriate circumstances so that certain embodiment(s) of the present disclosure described herein may be practiced in other sequences than illustrated herein.

Certain embodiments of the present disclosure are described in a progressive manner, where certain embodiment(s) focuses its differences from other embodiment(s), and same or similar parts are shared between the various embodiments. Certain features described herein may be replaced by or combined with certain other features, to implement or use the present disclosure. As for the device embodiment(s), since it is basically similar to the method embodiment(s), the description is relatively simple. For relevant details, relevant features of the method embodiment (s) may be referred to.

In certain embodiment(s), relational terms such as "first" and "second" are only used to distinguish one entity or operation from another entity or operation, and do not necessarily require or imply any actual relationship or sequence between these entities or operations. In certain embodiment(s), terms "includes," "comprises," or any other variation thereof are intended to cover a non-exclusive inclusion, such that a process, method, article, or apparatus that includes a list of elements includes not only those elements, but also those other elements not expressly listed, or elements inherent to the process, method, article or equipment. Unless otherwise clarified, an element qualified by the statement "comprises a . . . " does not exclude the presence of additional identical elements in the process, method, article, or device that includes the element.

Embodiments described herein are believed to enable the making and using of the present disclosure. Modifications to these embodiments are readily apparent, and the generic principles defined herein may be practiced without having to depart from the spirit or scope of the application. Therefore, the present disclosure is not to be limited to the embodiments shown herein but is to be accorded the widest scope consistent with the principles and novel features disclosed herein.

Described herein are certain embodiments of the present disclosure. Improvements and modifications may be made without having to depart from the principles of the present application. These improvements and modifications are within the protection scope of the present disclosure.

What is claimed is:

1. An information processing method, comprising:

obtaining a user dialog message in a dialog interaction interface;

determining a user's first intention of the user dialog message;

obtaining another user dialog message in the dialog interaction interface associated with a user's second intention;

in response to a determination that the user's first intention and the user's second intention do not meet a correlation condition, outputting an intention decision prompt, the intention decision prompt being used to prompt the user to confirm on which intention of the first and second intensions to process; and according to a response result from the user to the intention decision prompt, outputting a dialog feedback message based on either the user's first intention or the user's second intention for processing, wherein the user's second intention is a user intention for which a dialog interaction task has not been completed, the method further comprising:

in response to a determination that the user's first intention and the user's second intention with a latest cache time do not meet the correlation condition, caching the user's first intention as a user intention for which the dialog interaction task has not been completed and recording the cache time of the user's first intention.

2. The method of claim 1, wherein outputting the dialog feedback message comprises:

obtaining a decision result input by the user in response to the intention decision prompt; and when a decision result indicates that the user wishes to continue processing the user's second intention, and based on a dialog context associated with the user's second intention, outputting a dialog feedback message related to the user's second intention to the dialog interaction interface.

3. The method of claim 2, further comprising:

after confirming that a dialog interaction task related to the user's second intention has been processed, outputting a dialog feedback message to the dialog interaction interface based on the user's first intention and the user dialog message.

4. The method of claim 2, further comprising:

in response to the decision result indicating that the user does not wish to continue processing the user's second intention, marking the user's second intention as a user intention for which the dialog interaction task has been completed.

5. The method of claim 1, wherein outputting the dialog feedback message comprises:

obtaining a decision result input by the user in response to the intention decision prompt; and when a decision result indicates that the user does not wish to continue processing the user's second intention, outputting a dialog feedback message to the dialog interaction interface based on the user's first intention and the user dialog message.

6. The method of claim 1, wherein outputting the dialog feedback message comprises:

when no response operation is detected for the intention decision prompt after a set time period, outputting a dialog feedback message to the dialog interaction interface based on the user's first intention and the user dialog message.

7. The method of claim 6, wherein outputting the dialog feedback message comprises:

based on the user's first intention, outputting the dialog feedback message corresponding to the user dialog message to the dialog interaction interface; and the method further comprises:

after confirming that a dialog interaction task related to the user's first intention has been processed, outputting an intention processing prompt, the intention processing prompt being used to prompt the user on whether to process the user's second intention; and detecting a confirmation processing indication input to the intention processing prompt, and outputting a dialog feedback message related to the user's second intention to the dialog interaction interface based on the dialog context associated with the user's second intention, the confirmation processing indication indicating that the user wishes to continue processing the user's second intent.

8. An information processing device, comprising: a memory storing computer program instructions; and a processor coupled to the memory and configured to execute the computer program instructions and perform:

obtaining a user dialog message in a dialog interaction interface;

determining a user's first intention of the user dialog message;

obtaining another user dialog message in the dialog interaction interface associated with a user's second intention;

in response to a determination that the user's first intention and the user's second intention do not meet a correlation condition, outputting an intention decision prompt, the intention decision prompt being used to prompt the user to confirm on which intention of the first and second intensions to process; and according to a response result from the user to the intention decision prompt, outputting a dialog feedback message based on either the user's first intention or the user's second intention for processing, wherein the user's second intention is a user intention for which a dialog interaction task has not been completed, and the processor is further configured to perform:

in response to a determination that the user's first intention and the user's second intention with a latest cache time do not meet the correlation condition, caching the user's first intention as a user intention for which the dialog interaction task has not been completed and recording the cache time of the user's first intention.

9. The information processing device of claim 8, wherein outputting the dialog feedback message includes:

obtaining a decision result input by the user in response to the intention decision prompt; and when a decision result indicates that the user wishes to continue processing the user's second intention, and based on a dialog context associated with the user's second intention, outputting a dialog feedback message related to the user's second intention to the dialog interaction interface.

10. The information processing device of claim 9, wherein the processor is further configured to execute the computer program instructions and perform:

after confirming that a dialog interaction task related to the user's second intention has been processed, outputting a dialog feedback message to the dialog interaction interface based on the user's first intention and the user dialog message.

11. The information processing device of claim 9, wherein and wherein the processor is further configured to execute the computer program instructions and perform:

in response to the decision result indicating that the user does not wish to continue processing the user's second intention, marking the user's second intention as a user intention for which the dialog interaction task has been completed.

12. The information processing device of claim 8, wherein outputting the dialog feedback message includes:

obtaining a decision result input by the user in response to the intention decision prompt; and when a decision result indicates that the user does not wish to continue processing the user's second intention, outputting a dialog feedback message to the dialog interaction interface based on the user's first intention and the user dialog message.

13. The information processing device of claim 8, wherein outputting the dialog feedback message includes:

when no response operation is detected for the intention decision prompt after a set time period, outputting a dialog feedback message to the dialog interaction interface based on the user's first intention and the user dialog message.

14. The information processing device of claim 13, wherein outputting the dialog feedback message includes:

based on the user's first intention, outputting the dialog feedback message corresponding to the user dialog message to the dialog interaction interface; and the processor is further configured to perform:

after confirming that a dialog interaction task related to the user's first intention has been processed, outputting the intention processing prompt, the intention processing prompt being used to prompt the user on whether to process the user's second intention; and detecting a confirmation processing indication input to the intention processing prompt, and outputting a dialog feedback message related to the user's second intention to the dialog interaction interface based on the dialog context associated with the user's second intention, the confirmation processing indication indicating that the user wishes to continue processing the user's second intent.

15. A non-transitory computer-readable storage medium storing computer program instructions executable by at least one processor to perform:

obtaining a user dialog message in a dialog interaction interface;

determining a user's first intention of the user dialog message;

obtaining another user dialog message in the dialog interaction interface associated with a user's second intention;

in response to a determination that the user's first intention and the user's second intention do not meet a correlation condition, outputting an intention decision prompt, the intention decision prompt being used to prompt the user to confirm on which intention of the first and second intensions to process; and according to a response result from the user to the intention decision prompt, outputting a dialog feedback message based on either the user's first intention or the user's second intention for processing, wherein the user's second intention is a user intention for which a dialog interaction task has not been completed, and the at least one processor is further configured to perform:

in response to a determination that the user's first intention and the user's second intention with a latest cache time do not meet the correlation condition, caching the user's first intention as a user intention for which the dialog interaction task has not been completed and recording the cache time of the user's first intention.

16. The non-transitory computer-readable storage medium of claim 15, wherein outputting the dialog feedback message includes:

obtaining a decision result input by the user in response to the intention decision prompt; and when a decision result indicates that the user wishes to continue processing the user's second intention, and based on a dialog context associated with the user's second intention, outputting a dialog feedback message related to the user's second intention to the dialog interaction interface.

17. The non-transitory computer-readable storage medium of claim 15, wherein outputting the dialog feedback message includes:

obtaining a decision result input by the user in response to the intention decision prompt; and when a decision result indicates that the user does not wish to continue processing the user's second intention, outputting a dialog feedback message to the dialog interaction interface based on the user's first intention and the user dialog message.

18. The non-transitory computer-readable storage medium of claim 15, wherein outputting the dialog feedback message includes:

when no response operation is detected for the intention decision prompt after a set time period, outputting a dialog feedback message to the dialog interaction interface based on the user's first intention and the user dialog message.

* * * * *